Figure 1:
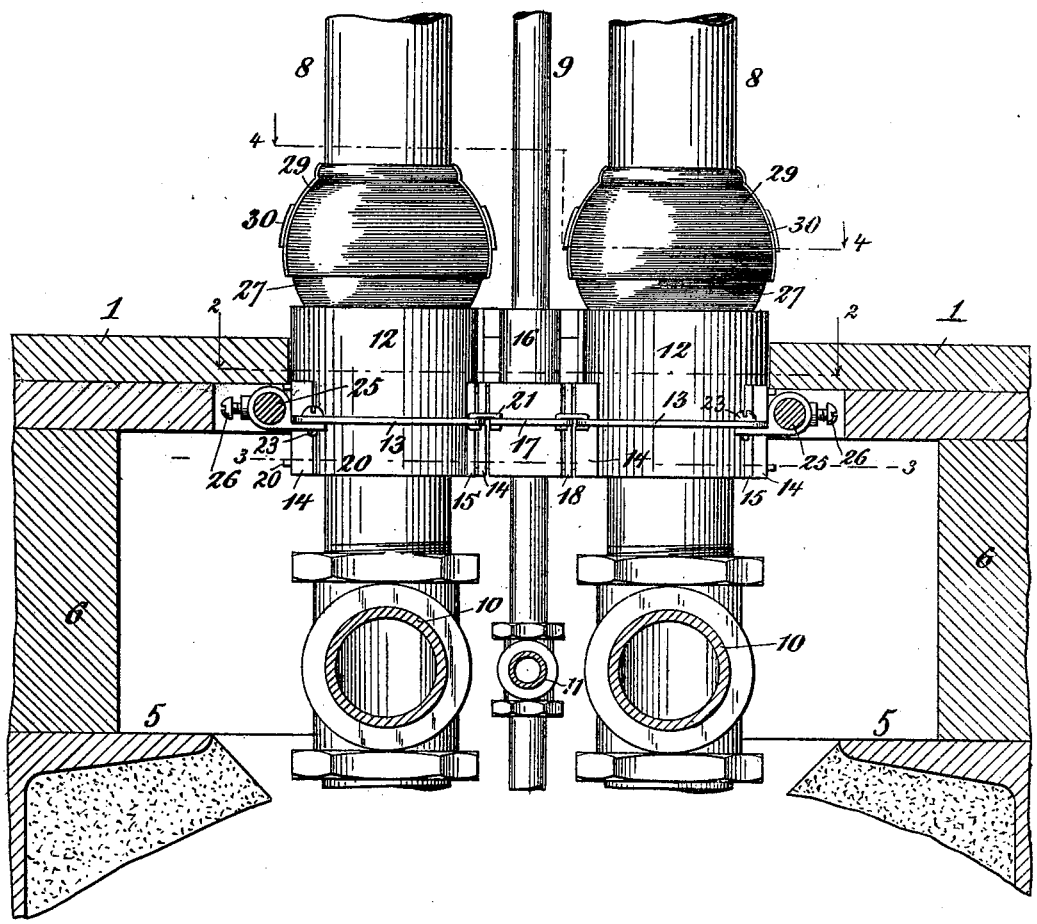

No. 631,314. Patented Aug. 22, 1899.
J. MARQUARDT.
PIPE THIMBLE.
(Application filed July 5, 1898.)

(No Model.) 2 Sheets—Sheet 1.

WITNESSES:

INVENTOR
Joseph Marquardt
BY
Henry D. Williams
ATTORNEY

No. 631,314. Patented Aug. 22, 1899.
J. MARQUARDT.
PIPE THIMBLE.
(Application filed July 5, 1898.)
(No Model.) 2 Sheets—Sheet 2.
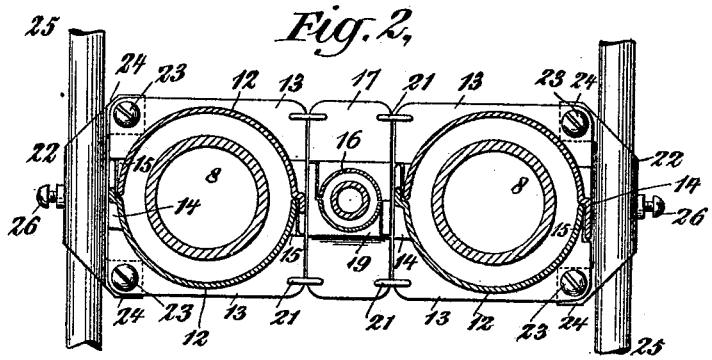
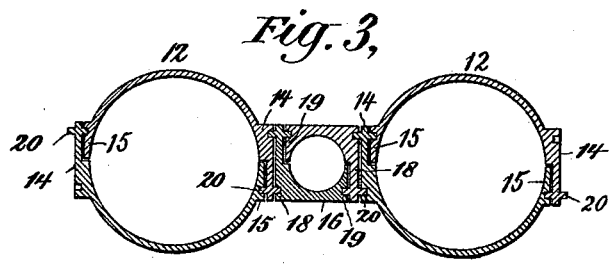
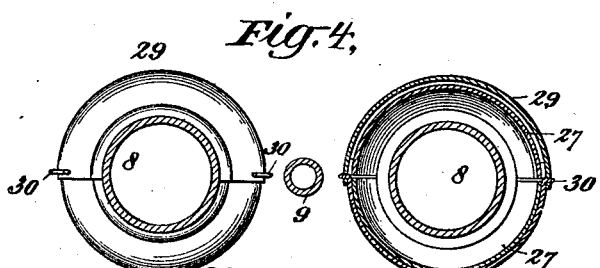
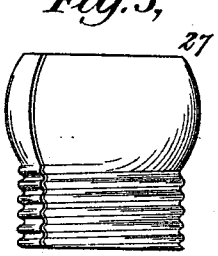
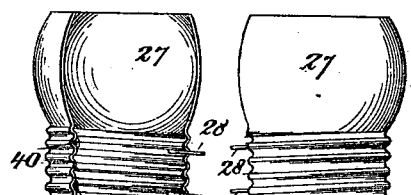
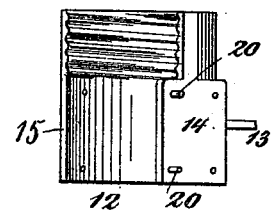
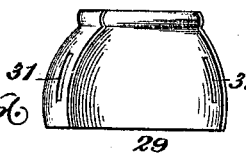
WITNESSES:
INVENTOR
Joseph Marquardt
BY
Henry D. Williams
ATTORNEY
THE NORRIS PETERS CO., PHOTO-LITHO., WASHINGTON, D. C.

UNITED STATES PATENT OFFICE.

JOSEPH MARQUARDT, OF NEW YORK, N. Y.

PIPE-THIMBLE.

SPECIFICATION forming part of Letters Patent No. 631,314, dated August 22, 1899.

Application filed July 5, 1898. Serial No. 685,085. (No model.)

*To all whom it may concern:*

Be it known that I, JOSEPH MARQUARDT, a citizen of the United States, and a resident of the city of New York, county and State of New York, have invented certain new and useful Improvements in Pipe-Thimbles, of which the following is a specification, reference being had to the accompanying drawings, forming part hereof.

This invention relates to pipe-thimbles or means for forming a joint between one or more pipes and a wall or ceiling, and has for its objects generally the production of devices which shall form a sound-proof, dirt-proof, and waterproof joint and yet permit freedom of movement within desired limits under expansion and contraction and other causes of the multitudinous vibrations and movements to which such pipes are subjected, thereby relieving the structure, and especially the plaster-work or ceiling, from the vibrations and strains usually resulting from the movements of the pipes; and it also has for its object to facilitate the work of setting the pipes and holding them in place during construction and to facilitate generally the work of construction, including the placing of the thimbles, plastering, floor-laying, &c.

According to my invention the thimbles are so constructed that they may be built up and joined together interchangeably to accommodate any number and arrangement of pipes, and the parts may be divided so that they may be placed around the piping after the piping has been put in place and its sections joined together.

According to my invention means are provided for accurately spacing and setting the pipes and thimbles in desired position and at the desired distance from the walls and holding them in such positions during the completion of the construction and after completion, without strain upon the plaster or other parts of the construction. To the end that a perfectly tight joint may be obtained, but with freedom of movement of the pipes without strain upon the structure, I provide connectors fitting tightly about the pipes, but having a universal movement relatively to the fixed part of the structure.

My invention includes various improvements in construction, all of which will now be particularly described with reference to the accompanying drawings.

Figure 1 is a side elevation of risers of piping, including two large pipes and a small pipe, provided with floor-thimbles embodying my invention, the branch pipes and flooring being shown in section. Fig. 2 is a horizontal section of the risers and thimbles on the line 2 2, Fig. 1. Fig. 3 is a horizontal section of the same on line 3 3, Fig. 1. Fig. 4 is a horizontal section of the same on the line 4 4, Fig. 1. Fig. 5 is a side elevation of one of the collars for holding the bulbs or connectors, with the joint of the two halves in oblique position. Fig. 6 shows the two halves of one of such collars separated and in oblique elevation. Figs. 7 and 8 are oblique elevations of the two halves of one of the bulbs or connectors. Fig. 9 is an oblique elevation of one of the halves of one of the large floor-sleeves.

In Fig. 1 the parts of a floor are illustrated, including the floor 1, iron supporting-beams 5, and floor-sleepers 6. The construction of these parts shown is merely selected for illustration and need not be further described, and my improved thimbles may be used with any character of such constructions.

Two large vertical pipes or risers 8 8, one of which may be a feed and the other a return, and a small vertical pipe or riser 9, which may be an air or drip pipe and which is arranged between the two large pipes, are shown in the drawings, and the thimbles embodying my invention are shown as built up for such a number and arrangement of pipes; but, as will be hereinafter fully explained, the thimbles may be built up from a greater or less number of parts of the construction shown or other construction embodying my invention to accommodate a greater or less number of pipes or a different arrangement of pipes.

The floor-thimble and ceiling-thimble will usually be separate structures, with sufficient room between them for the branch pipes 10 10 11 and the couplings therefor, and they will thus accommodate themselves to different thicknesses of floor and ceiling structures, the distances between the thimbles varying with different thicknesses of floor and ceiling structures.

My invention may be embodied either in floor-thimbles or ceiling-thimbles; but I have shown only its embodiment in a floor-thimble and will now describe this floor-thimble, which comprises interlocking parts, forming in the construction shown three sleeves for three pipes, each sleeve being divided or built up of sections, so that the parts may be placed around the pipe and interlocked together after the piping is in place and the parts of adjacent sleeves also being constructed to interlock with each other. In the construction shown embodying my invention each large sleeve is composed of two parts or halves, both of the same construction, and the small sleeve is composed of two parts or halves, also both of the same construction. Each half of a large sleeve comprises a semicylindrical portion 12, which is the sleeve proper, a joining flange 13, and registering flanges 14 15, which fit against counterpart flanges in adjacent parts, each full flange 14 being inwardly recessed to receive the half flange 15 of the other half of the same sleeve and abutting outwardly against the full flange of the adjacent sleeve. Each half of the small sleeve has a semicylindrical sleeve portion 16, a joining flange 17, a full registering flange 18, and a half registering flange 19, and the halves fit together in the same manner as the halves of the large sleeve. As particularly shown in Fig. 3, adjacent sleeves are interlocked together, the right-hand full registering flange 14 of the left-hand large sleeve abutting against the left-hand full registering flange 18 of the middle small sleeve and the right-hand full registering flange 18 of the middle small sleeve abutting against the left-hand full registering sleeve 14 of the right-hand large sleeve. Engaging pins or studs 20 are provided on the registering flanges, which enter counterpart orifices in adjacent registering flanges.

The means provided for holding adjacent sleeves together are shown as wires or staples 21, which are entered into orifices in the joining flanges 17 and 13, respectively, near their abutting edges, and which may be bent over so as to tightly clamp the joining flanges together at their abutting edges, and thus to secure the sleeves together. To make the joints in the parts of the sleeves water-tight, thin sheets or films of rubber or other elastic material (not shown) may be placed between the abutting faces of the registering flanges.

For the purpose of locking the outer ends of the thimbles together I provide locking-pieces 22, which extend the full width of the thimble and may be secured to the joining flanges by screws 23, as shown, these screws passing through the perforations of the joining flange, which in the middle portions would receive the staples 21 and entering lugs 24 of the locking-pieces. These locking-pieces 22 also afford means for setting the thimbles and holding them in place during the work of construction and after the completion of construction, being provided with sockets receiving spacing-rods 25 and with set-screws 26 for clamping the spacing-rods 25 in desired position. These spacing-rods may be set so as to abut against the wall or other portion of the structure, and thereby the thimbles and pipes may be adjusted to desired position and will be permanently held in such position. Temporary bushings may be used between the pipes and sleeves during construction.

In assembling the parts about the pipes the parts of the individual sleeves may first be put together and then adjacent sleeves engaged. The staples 21 may then be inserted and clenched and the locking-pieces 22 secured in place. The joining flanges 13 17 or the spacing-rods will rest upon some available part of the structure, and the thimble should be placed at such a height that the upper ends of the sleeve will project slightly above the floor, so as to prevent water from dripping down upon the ceiling below.

Each of the large sleeves 12 12 of the thimble above described is internally threaded at its upper end (see Fig. 9) to receive a collar 27, the lower end of which is threaded to engage the threads of the sleeve, while the upper portion of each collar has a bearing part in the shape of a zone of a hollow sphere. One of these collars is separately shown in Figs. 5 and 6 and is sectional or divided and in the construction shown embodying my invention is made up of two halves, provided with registering pins 28, each registering pin entering a counterpart orifice 40 in the opposite half, and both halves are of the same construction. The two halves are tightly locked together when screwed into the sleeve.

Each collar 27 is provided with a connector shaped at its upper end so as to tightly embrace the pipe and which in the embodiment of my invention shown is a bulb 29 in the general form of a zone of a hollow sphere and fits over the bearing part or spherical portion of the collar 27, but with sufficient freedom to turn thereon in any direction to accommodate movements of the pipe. These connectors or bulbs are also sectional or divided and in the construction shown embodying my invention are made in two halves, (see Figs. 7 and 8,) one half being provided with outwardly-extending tongues 30 30 and the other half having registering slots 31 31 formed therein, the half having the slots 31 slightly overlapping the half having the tongues 30. In assembling the parts of each set of bulbs and collars the two halves of the connector or bulb may be first interlocked about the pipe and then the two halves of the collar separately inserted in them and sprung together, and then the collar carrying the connector or bulb may be screwed into the sleeve.

It is of course evident that the connectors would be inverted if used in a ceiling-thimble and the collars would extend upward into sockets in the ceiling-thimble.

In the construction shown embodying my invention the large sleeves of the thimble have an inner diameter considerably larger than the outer diameter of the pipe, so as to allow for considerable movement and vibration of the pipes without strain or shock to the thimble or structure. In some instances, and especially where very small pipes are used that are not highly heated, as with the small air or drip pipe 9 shown, the collars or connectors or bulbs may be omitted, or in some instances the connectors or bulbs only may be omitted. Usually with an air or drip pipe there is no appreciable expansion and contraction, and little clearance is therefore needed between such a pipe and its sleeves, as in the construction shown.

Sleeves of one size will accommodate several sizes of pipe, as the connectors or bulbs 29 are the only parts that fit the pipes. These connectors or bulbs may fit tightly around the pipes, so as to make a perfectly tight joint; but by reason of their universal movement relatively to the collars 27 they will move with the pipe without strain or shock to the thimbles. It is to be observed that the movements of the pipe may not only be angular movements, inclining the pipe from the horizontal in any direction, but also they may be movements which as to the part of the pipe within the thimble may be termed "lateral" movements of translation, or they may be angular movements acccompanied by lateral movements, or they may be longitudinal movements or combinations of all of these characters of movements. None of these movements are of great extent, but they are of frequent occurrence and under great force. At times a vibration is set up in the pipes which continues for a long period, and the slow but powerful movements under expansion and contraction occur under all variations of temperature. My invention provides for the taking up of all these movements in the connectors without strains to the floors, walls, or ceilings. A lateral movement of a pipe would cause a movement of the bulb 29 over the spherical bearing of the collar 27, and the slight tipping of the bulb would be accommodated by a slight angular movement of the bulb relatively to the pipe, as the pipe is not secured to the bulb and the bulb has a narrow bearing thereon. A longitudinal movement of a pipe would cause it to slide longitudinally in the bulb, and an angular movement of a pipe in any direction would merely cause a movement of the bulb upon its spherical bearing. Where a very large amount of movement due to expansion and contraction has to be provided for, larger sleeves and collars may be employed, with connectors or bulbs tightly fitting around the pipes.

It is evident that various modifications may be made in construction within the purview of my invention and that parts of my invention may be separately used or used in connection with other parts not embodying my invention.

What I claim, and desire to secure by Letters Patent, is—

1. Means for forming a joint between a pipe and a floor, wall or ceiling comprising holding means adapted to be secured to the structure and constructed to permit freedom of movement of the pipe therein, and a connector constructed to fit the pipe with freedom of longitudinal movement and slight freedom of angular movement relatively thereto and having a universal connection with such holding means, substantially as set forth.

2. Means for forming a joint between a pipe and a floor, wall or ceiling comprising divided means adapted to be secured to the structure and constructed to permit freedom of movement of the pipe therein and a divided connector constructed to fit the pipe with freedom of longitudinal movement and slight freedom of angular movement relatively thereto and having a universal connection with such divided means, substantially as set forth.

3. Means for forming a joint between a pipe and a floor, wall or ceiling comprising means adapted to be secured to the structure, a collar removably connected thereto, and a connector constructed to fit the pipe with freedom of longitudinal movement and slight freedom of angular movement relatively thereto and having a universal connection with such collar, substantially as set forth.

4. Means for forming a joint between a pipe and a floor, wall or ceiling comprising divided means adapted to be secured to the structure, a divided collar having a screw-threaded connection therewith and a divided connector constructed to fit the pipe with freedom of longitudinal movement and slight freedom of angular movement relatively thereto and having a universal connection with such collar, substantially as set forth.

5. A pipe-thimble comprising a sleeve constructed to permit freedom of movement of the pipe therein and a connector constructed to fit the pipe with freedom of longitudinal movement and slight freedom of angular movement relatively thereto and having a universal connection with the sleeve, substantially as set forth.

6. A pipe-thimble comprising a divided sleeve constructed to permit freedom of movement of the pipe therein and a divided connector constructed to fit the pipe with freedom of longitudinal movement and slight freedom of angular movement relatively thereto and having a universal connection with the sleeve, substantially as set forth.

7. A pipe-thimble comprising a sleeve constructed to permit freedom of movement of the pipe therein, a collar removably connected to said sleeve and a connector constructed to fit the pipe with freedom of longitudinal movement and slight freedom of angular movement relatively thereto and having a universal connection with said collar, substantially as set forth.

8. A pipe-thimble comprising a divided sleeve constructed to permit freedom of movement of the pipe therein, a divided collar having a screw-threaded connection with said sleeve, and a divided connector constructed to fit the pipe with freedom of longitudinal movement and slight freedom of angular movement relatively thereto and having a universal connection with said collar, substantially as set forth.

9. A pipe-thimble comprising a plurality of separate sleeves constructed so as to be interchangeably joined together, substantially as set forth.

10. A pipe-thimble comprising a plurality of separate divided sleeves constructed so as to be interchangeably joined together, substantially as set forth.

11. A pipe-thimble comprising a plurality of separate sleeves constructed so as to be interchangeably joined together, one or more of said sleeves being provided with a connector constructed to fit the pipe and having a universal connection with the sleeve, substantially as set forth.

12. A pipe-thimble comprising a plurality of sleeves constructed so as to be joined together, one or more of said sleeves being provided with a collar removably connected thereto and with a connector constructed to fit the pipe and having a universal connection with the collar, substantially as set forth.

13. A pipe-thimble comprising a plurality of separate divided sleeves constructed so as to be interchangeably joined together, one or more of said sleeves being provided with a divided collar having a screw-threaded connection therewith and with a divided connector constructed to fit the pipe and having a universal connection with the collar, substantially as set forth.

14. A pipe-thimble comprising divided parts constructed to be placed together about the pipe or pipes, and locking-pieces for the divided parts, said locking-pieces being provided with means for spacing the thimble relatively to the wall, substantially as set forth.

15. A pipe-thimble comprising a plurality of separate divided sleeves constructed so as to be interchangeably joined together, and locking-pieces for the divided parts, said locking-pieces being provided with means for spacing the thimble relatively to the wall, substantially as set forth.

16. A pipe-thimble comprising a plurality of separate sleeves, each sleeve being composed of two parts interlocked together and having joining flanges, and holding means engaging such flanges whereby adjacent sleeves are secured together, substantially as set forth.

17. A pipe-thimble comprising a plurality of separate sleeves, each sleeve being composed of two parts interlocked together and having joining flanges, holding means engaging such joining flanges whereby adjacent sleeves are secured together, and locking-pieces engaging the outer joining flanges whereby the divided parts are locked together, substantially as set forth.

18. A pipe-thimble comprising a plurality of separate sleeves, each sleeve being composed of two parts interlocked together and having joining flanges, holding means engaging such joining flanges whereby adjacent sleeves are joined together, and locking-pieces engaging the outer joining flanges whereby the divided parts are locked together, said locking-pieces being provided with means for spacing the thimble relatively to the wall, substantially as set forth.

19. Means for forming a joint between a pipe and a floor, wall or ceiling comprising holding means adapted to be secured to the structure and constructed to permit freedom of movement of the pipe therein and having a bearing part of spherical form, and a bulb fitting movably upon said bearing part and constructed to fit the pipe, substantially as set forth.

20. Means for forming a joint between a pipe and a floor, wall, or ceiling comprising divided holding means adapted to be secured to the structure and constructed to permit freedom of movement of the pipe therein and having a bearing part of spherical form, and a divided bulb fitting movably upon said bearing part and constructed to fit the pipe, substantially as set forth.

21. A pipe-thimble comprising a sleeve constructed to permit freedom of movement of the pipe therein and having a bearing part of spherical form, and a bulb fitting movably upon said bearing part and constructed to fit the pipe, substantially as set forth.

22. A pipe-thimble comprising a divided sleeve constructed to permit freedom of movement of the pipe therein and having a bearing part of spherical form, and a divided bulb fitting movably upon said bearing part and constructed to fit the pipe, substantially as set forth.

23. A pipe-thimble comprising a sleeve constructed to permit freedom of movement of the pipe therein, a collar removably connected to said sleeve and having a bearing part of spherical form and a divided bulb fitting movably upon said bearing part and constructed to fit the pipe, substantially as set forth.

24. A pipe-thimble comprising a divided sleeve constructed to permit freedom of movement of the pipe therein, a divided collar having a screw-threaded connection with said sleeve and having a bearing part of spherical form, and a divided bulb fitting movably upon said bearing part and constructed to fit the pipe, substantially as set forth.

25. In a pipe-thimble, in combination, a threaded sleeve, the threaded divided collar 27, having registering pins 28 and orifices 40, and having a zone-shaped spherical bearing, and the zone-shaped spherical bulb 29, having interlocking tongues and grooves 30, 31, substantially as set forth.

26. A pipe-thimble comprising a sleeve of two parts, each part having a half registering flange and a full registering flange, the full registering flange of one part overlapping the half registering flange of the other part and engaging pins and grooves upon the registering flanges whereby the two parts are locked together, substantially as set forth.

27. A pipe-thimble made up of two or more sleeves, each sleeve being composed of two parts and each part having a half and full registering flange and engaging pins and grooves whereby the two parts are interlocked together and the full registering flanges of adjacent sleeves are registered together, substantially as set forth.

28. A pipe-thimble comprising a plurality of separate sleeves, each sleeve being composed of two parts and each part having a half and full registering flange and engaging pins and grooves whereby the two parts are interlocked together and adjacent sleeves are registered together, and each part having a joining flange and holding means engaging such joining flanges whereby adjacent sleeves are held together, substantially as set forth.

29. A pipe-thimble comprising a plurality of separate sleeves, each sleeve being composed of two parts and each part having a half and full registering flange and engaging pins and grooves whereby the two parts are interlocked together and adjacent sleeves are registered together, and each part having a joining flange, and holding means engaging such joining flanges whereby adjacent sleeves are held together, and locking-pieces engaging the outer joining flanges whereby the divided parts are locked together, substantially as set forth.

30. A pipe-thimble comprising a plurality of separate sleeves, each sleeve being composed of two parts and each part having a half and full registering flange and engaging pins and grooves whereby the two parts are interlocked together and adjacent sleeves are registered together, and each part having a joining flange and holding means engaging such joining flanges whereby adjacent sleeves are held together, and locking-pieces engaging the outer joining flanges whereby the divided parts are locked together, and spacing-rods adjustably held in said locking-pieces, substantially as set forth.

Signed in the borough of Manhattan, county of New York, in the city of New York and State of New York, this 30th day of June, 1898.

JOSEPH MARQUARDT.

Witnesses:
HENRY D. WILLIAMS,
HERBERT H. GIBBS.